358-84. OR 3,878,322 SR

United States Patent [19]

Sullivan

[11] 3,878,322

[45] Apr. 15, 1975

[54] INTERROGATED SYSTEM

[75] Inventor: Herbert W. Sullivan, New York, N.Y.

[73] Assignee: Skiatron Electronics & Television Corporation, New York, N.Y.

[22] Filed: Feb. 28, 1973

[21] Appl. No.: 336,894

Related U.S. Application Data

[60] Division of Ser. No. 30,599, April 21, 1970, Pat. No. 3,757,035, which is a continuation of Ser. No. 297,397, July 24, 1963, abandoned.

[52] U.S. Cl......... 178/5.1; 178/DIG. 13; 340/152 T; 340/408

[51] Int. Cl. ............................................. H04n 1/44

[58] Field of Search ...... 178/5.1, DIG. 13; 340/408, 340/152 T

[56] References Cited

UNITED STATES PATENTS

| | | | |
|---|---|---|---|
| 2,980,898 | 4/1961 | Mason | 340/408 |
| 3,078,337 | 2/1963 | Shanahan | 178/5.1 |
| 3,130,265 | 4/1964 | Leonard | 178/DIG. 13 |
| 3,256,517 | 6/1966 | Saltzberg | 340/408 |

*Primary Examiner*—Maynard R. Wilbur
*Assistant Examiner*—S. C. Buczinski
*Attorney, Agent, or Firm*—Cushman, Darby & Cushman

[57] ABSTRACT

Method and apparatus for selectively interrogating decoding devices which are located at remote stations. In one embodiment, a number of transponders which make up a final group within a larger group of transponders, all attached to a common line running from a central station, are selected and simultaneously caused to retransmit modified interrogation signals in accordance with certain informational characteristics and the identity of each transponder retransmitting. The final group of transponders, which include respective decoding devices, chosen to be interrogated is selected by first sending a number n of tones of a larger group of tones m down a branch line to partially activate some of the decoding devices. These tones are followed by a smaller number of tones k chosen from the group n to which only the decoding devices in the final group respond. The system is particularly designed for use in a subscriber television network and specific circuitry for accomplishing the logical and electrical functions required are described.

13 Claims, 11 Drawing Figures

T 502

INTERROGATED SYSTEM

This application is a division of my copending application Ser. No. 30,599 filed Apr. 21, 1970, now U.S. Pat. No. 3,757,035, which is a continuation of my earlier application Ser. No. 297,397 filed July 24, 1963 now abandoned.

This invention relates to interrogated transponders and more particularly to a system in which predetermined transponders at remote stations operating with a central station may be selected for interrogation with the selected transponders retransmitting interrogation signals originally produced by the central station in accordance with the condition of equipment being monitored at the remote station.

There are many situations in which it is desired to receive at a central station data which is indicative of the condition of a piece of equipment at a remotely located station. Typical among these situations are the monitoring and reading of various gauges and meters at remote locations, interrogating aircraft to establish their identity; obtaining information as to scientific measurements by a satellite or the condition of apparatus thereon; determining the condition of a radio or television receiver at a remote station, etc.

One method of obtaining information from remote stations is by using an interrogated transponder system. In this system each remote station is provided with a transponder which is triggered into operation by signals from the central station. After being triggered the transponder operates to produce signals representative of the condition of the equipment being monitored and these signals are transmitted back to the central station.

A typical prior art transponder at a remote station is produced with some mechanical or electromechanical control device which produces a series of data pulses indicating the condition of the equipment being monitored. The transponder control device is in turn set by a switch, a pressure temperature or other suitable type of transducer, or is preset to give various identification codes. The latter arrangement is used, for example, to indicate the identity of aircraft or other types of vessels. Prior art transponders of the type referred to suffer from several disadvantages. One of these is the relatively complex control device needed to produce the complicated codes necessary for transmission of a considerable amount of data back to the central station.

Where certain ones or a group of a number of remote stations are to be selectively interrogated at a particular time, additional problems arise in the prior art systems. There, in order to select a particular station or group of stations to be interrogated, each transponder must be provided with a device which is responsive to a code transmitted by the central station so that a transponder can be selectively activated. Such code selection apparatus further adds to the complexity of the transponder which, of course, is undesirable.

The present invention is directed to a transponder system which operates in a manner to solve many of the aforesaid problems. In accordance with the invention the remote station transponder does not locally generate its own coded data pulses to indicate the condition of the equipment being monitored. Instead, the central station transmits interrogation signals which are retransmitted by the transponder at the remote station after being modified to produce data corresponding to the condition of the equipment being monitored. In a preferred embodiment of the invention the modified signals are also shifted in frequency to a predetermined frequency before retransmission in order to identify the transponder. Thus, a relatively simple coding control device can be provided at the remote station, since the complex codes necessary to obtain large amounts of data are generated at the central station, and only a modification for data purposes and frequency shift for identification purposes is performed at the remote station.

The present invention also provides a novel arrangement by which predetermined ones or a group of remote stations may be finally selected from a larger number of stations for interrogation at any one time. In accordance with this aspect of the invention each of the transponders being used with the system is provided with circuits for recognizing and responding to only certain sets of predetermined signals transmitted from the central station. To activate a selected group or a single transponder for interrogation, the central station transmits a first set of signals which selectively and partially activates the transponders of a first major group of remote stations having circuits responsive to this particular first set of signals. The central station then transmits a second set of signals of a lesser number than the first set to finally activate the transponders of certain stations of the major group for interrogation. The finally selected transponders which are left activated after the second set of signals is received are then interrogated by signals transmitted from the central station. Each interrogated transponder of the finally selected group modifies the received interrogation signals to indicate the condition of the equipment being monitored and these modified signals are retransmitted back to the central station. This arrangement accomplishes the interrogation of the selected final group of remote stations from the over-all number of stations operating with a central station in a relatively simple manner.

The present system finds particular application when used for billing purposes in a subscription-type television system. In this type of system a large number of subscriber (remote) stations operate from a single transmission medium. A number of programs sent out over the transmission medium are available to each of the subscriber stations and the condition of the receiver at each subscriber station is to be monitored by a central station in order to obtain data for subscriber billing charges for the reception of particular programs. In this type of system the central station must be able to selectively interrogate the condition of the television receiver at each of the subscriber stations in order to be able to determine the charge to be made to an individual subscriber for program use.

In order to selectively interrogate the various subscriber stations in an economical manner the present invention provides a transponder at each of the subscriber stations. The central station operates to sequentially and selectively interrogate final groups of subscribers so that all of the subscribers are eventually interrogated after a certain length of time. The interrogation of the final groups of subscribers is carried out in the preferred embodiment of the invention by having the central station transmit a first set of tone signals which partially activate the transponders of a major group of subscriber stations. Next, a second set of tones selected from the first set is transmitted. This second set of tones selects and activates the final group of transponders which are to be responsive to the interrogation signals from the central station. The central station then sends out tone pulses which are used as the interrogation signals. These interrogation tone pulses are preferably tones of the first set which did not appear in the second set.

In accordance with the operation of the system, only the transponders of the finally selected group of subscriber stations operate to retransmit the received interrogation signals. Each transponder in the finally selected group modifies the received interrogation signals before retransmission to indicate the condition of the receiver at the subscriber station. In the preferred embodiment of the invention this modification is accomplished by transmitting the interrogation signals as 1 and 0 bits of data and providing logic circuits at the transponder for producing true, complementary and combinations of true and complementary bit signals in response to the interrogation bit signals in accordance with the condition of the receiver being monitored, i.e., to what station it is tuned, whether it is on or off, etc. These modified bit signals are then retransmitted back to the central station. Each transponder in a selected final group being interrogated also produces a predetermined individual tone modulation for the retransmitted signals to enable the central station to sort out the received signals for the purpose of billing individual stations of the interrogated group.

After one final group of subscribers has been interrogated and the billing information is obtained, the central station next proceeds to interrogate the other final groups of the major group. This is preferably accomplished by transmitting the same first set of tones to partially activate the transponders of the same first major group and then transmitting a different second set of tones of smaller number taken out of the first set to condition for interrogation a second final group of transponders in the major group. As before, the interrogation of the second final group is carried out by transmitting tones of the first set which were not used in the second set. This process continues until all of the groups of stations in the first major group are interrogated. At that time the central station transmits a different first set of tones to partially actuate the transponders of a second major group and the final groups of transponders in this second major group are interrogated in the same manner by successively transmitting different second sets of tones taken from the first set.

It is therefore an object of this invention to provide apparatus for interrogating a remote station by providing the remote station with a transponder which retransmits interrogation signals originally sent out by the central station.

A further object of the invention is to provide an interrogation system in which a predetermined one or group of stations operating within a larger number of stations may be selected for interrogation.

A further object of the invention is to provide an interrogation system in which a central station selects remote stations for interrogation by transmitting sets of signals of progressively smaller number to condition selected remote stations to receive and be responsive to interrogation signals.

Another object of the invention is to provide a transponder which retransmits interrogation signals received from a central station, the retransmitted signals being modified in accordance with the condition of the equipment being monitored at the remote station.

A further object of the invention is to provide apparatus for operating with a subscription television system in which a number of subscriber stations are selectively interrogated in groups to determine the operating condition of the receivers at the interrogated stations.

Yet another object of the invention is to provide a transponder for a subscription television receiver in which the condition of the receiver modified interrogation signals retransmitted by the connected transponder.

Still an additional object of the invention is to provide a transponder which is activated for interrogation by receiving two sets of signals, the first set being of a number $n$ and the second set being part of the first set and of a number $k$ which is less than $n$, the transponder being interrogated by interrogation signals comprising the signals of the first set not used in the second set.

Other objects and advantages of the present invention will become more apparent upon reference to the following specification and annexed drawings in which.

Figure 1:
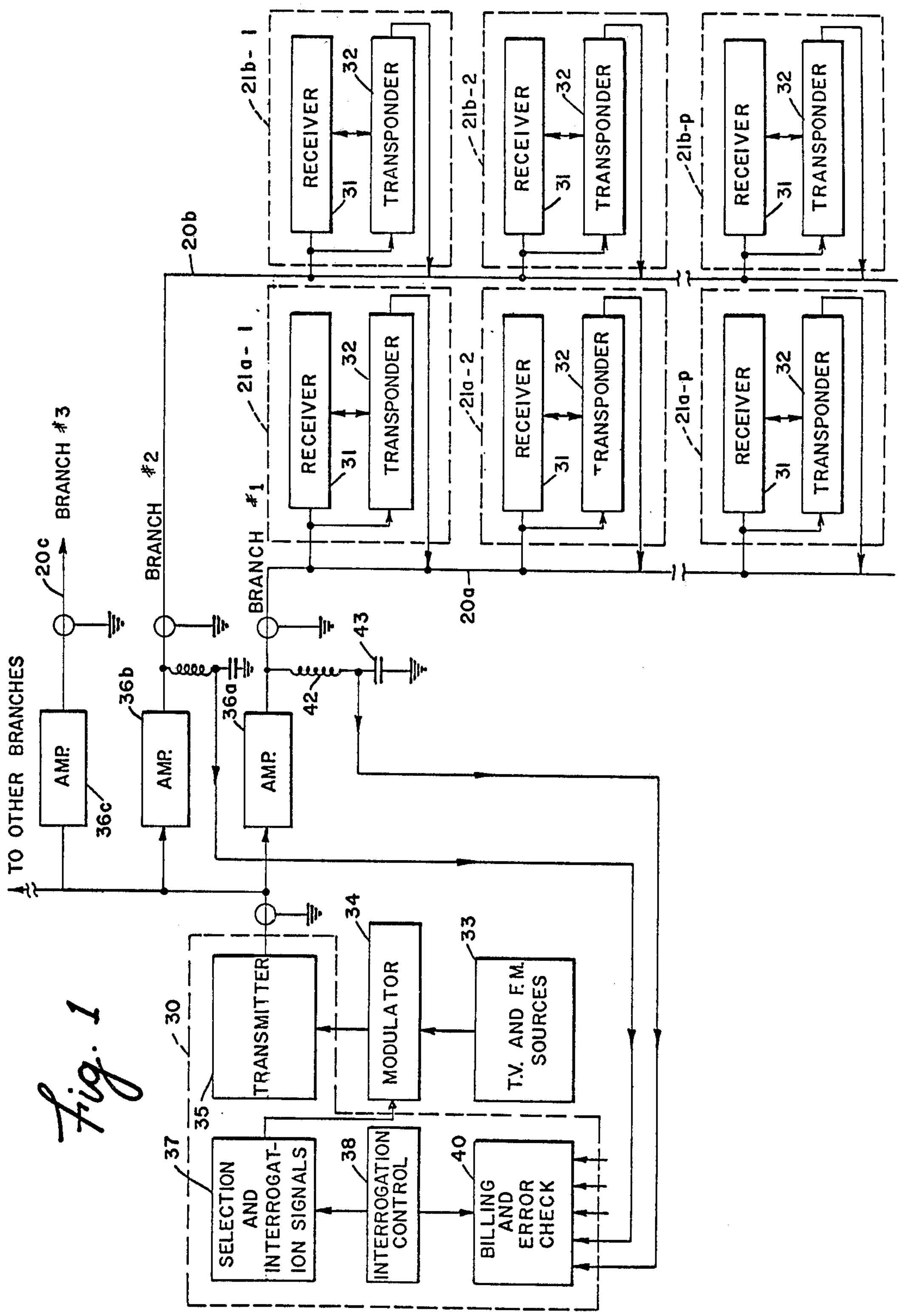
FIG. 1 is schematic diagram of an over-all subscription television system.

FIG. 1 shows a system in accordance with the present invention used for pay-television subscription apparatus. Here, a number of similar branch transmission lines 20*a*, 20*b*, . . . etc. are provided which originate from a central station 30. Each line has a number $p$ of similar subscriber stations connected. Those on line 20*a* are designated 21*a*-1, 21*a*-2, 21*a*-3, etc. Similarly for other lines, the stations are designated 21*b*-1, 21*b*-2, 21*b*-3, etc; 21*e*-1, 21*c*-2, 21*c*-3, etc.; and so forth. Each subscriber station is connected to a respective branch line to receive program information transmitted from the central station 30. As many branch lines 20 may be provided and as may subscriber stations connected to each line as is consistent with the capabilities of the central station and the lines themselves.

Each subscriber station has two principal components, a receiver 31 and a transponder 32. The receiver 31 is used to receive program information transmitted from the central station 30 and it may be of any type compatible for receiving this information, for example, a television receiver, AM or FM radio receiver, combinations of these receivers, etc. It should be understood that each branch line 20 has the necessary bandwidth for handling the transmitted signals. For example, if television signals are to be transmitted then the branch line is a coaxial cable or other suitable transmission line which can handle the correspondingly wide bandwidth.

The transponder 32 located at each subscriber station operates to receive selection and interrogation signals from the central station 30. Circuits are provided in the transponder to modify the received interrogation signals in accordance with the condition of the respectively connected receiver 31 and the transponder retransmits the modified signals, after shifting them to a particular frequency to identify a particular transponder, back to the central station 30 where they are used for billing and error check purposes. The construction and operation of the transponder is described in greater detail below.

FIG. 1 also shows a general arrangement by which program information, such as television and FM programs, along with the transponder selection and interrogation signals are transmitted to the subscriber stations on the various branch lines. Here, the programs to be transmitted originate at a single or a plurality of sources 33 which may be of any conventional type such as a television central or remote pickup station, FM radio station, etc. The information from the various sources 33 is applied to a modulator 34 where it is modulated onto a carrier wave of a frequency suitable for transmission over the various branch lines 20. The modulated carrier wave is then applied to a power amplifier and transmitter 35 whose output is applied to the parallel connected inputs of a number of amplifiers 36*a*, 36*b*, . . . etc., one amplifier being provided for each branch line 20. Each amplifier 36 serves as an isolation and buffer amplifier for its respectively connected branch line 20*a*, 20*b*, . . . etc. The amplifiers 36 amplify the output signal from transmitter 35 in order that each of the receivers 31 on a line shall receive a signal of sufficient amplitude for proper viewing.

The signals for selecting the various transponders to be interrogated and the interrogation signals themselves are also applied to the transmitter 35. These selection and interrogation signals are produced by a source 37 which is under the control of an interrogation signal control system 38. The selection signals are transmitted down each branch line 20 to select predetermined ones of the subscriber stations which are to be interrogated at one time in order to determine the condition of the respective receivers at these stations, i.e., channel to which it is tuned, etc. This selection is carried out in a preferred embodiment of the invention in a manner such that a predetermined group of stations on each branch line is interrogated at the same time. This arrangement permits a greater number of subscriber stations to be operated on each branch line. The selection process is described in greater detail below.

Figure 2:
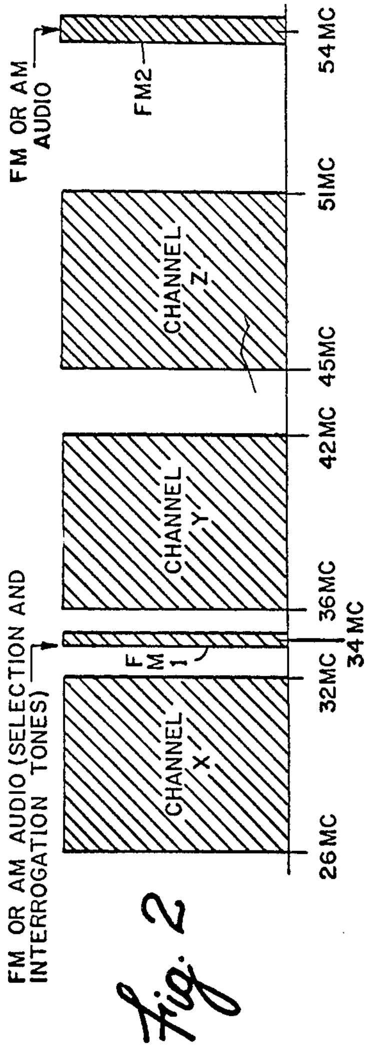
FIG. 2 is a diagram showing the typical program signals which may be transmitted.

FIG. 2 shows typical signals which may be transmitted over the respective branch lines 20. Here, there are five programs or channels of information which include video channels X, Y, and Z and two FM (frequency modulation) channels FM1 and FM2. The latter two channels may also be used for AM (amplitude modulation) information transmission. The various selection and interrogation signals are preferably transmitted on one of the FM or AM channels, such as FM1. The signals transmitted over the respective video channels normally originate from separate sources. Similarly, the FM or AM signals also normally originate from separate sources.

Typical operating frequencies which may be utilized for the various channels are listed in the chart below. It should be understood that the bandwidths and frequency spectrum allocation values are illustrative only and that signals of any suitable frequency may be transmitted on each branch line. Also, more channels than the five described may be transmitted over each branch line.

| CHANNEL | FREQUENCY (megacycles) |
|---|---|
| VIDEO X | 26 – 32 |
| FM 1 (selection and interrogation signals) | 34 – 35.2 |
| VIDEO Y | 36 – 42 |
| VIDEO Z | 45 – 51 |
| FM 2 | 53 – 55.5 |

After a certain final group of stations on each branch line has been selected for interrogation by the selection signals, the central station transmits the interrogation signals. These interrogation signals are applied to the transponder 32 at each of the selected stations and the transponder modifies the received interrogation signals in accordance with the condition of the receiver at the particular station, for example, whether the receiver is off, tuned to video channel X, video channel Y, etc. Each transponder in the group being interrogated imparts to the modified interrogation signals a characteristic which uniquely identifies that transponder with respect to the group. This characteristic is preferably imparted by shifting the frequency of the modified interrogation signals to a different predetermined frequency at each transponder before retransmission to the central station.

The modified interrogation signals are applied to a separate line (not shown) such as a telephone line or back onto the branch line 20*a*, 20*b*, . . . etc. for transmission to billing and error check apparatus 40 at the central station. The billing and error check apparatus operates under the control of the selection and interrogation control unit 38 so that the billing and error check is performed for the corresponding group of stations being interrogated on each line at any one time.

In a preferred embodiment of the invention the frequency-shifted modified interrogation signals sent by the transponders at the interrogated stations are of a relatively low frequency and in the audio range. These low frequency signals are taken off the respective branch line 20 or other separate line prior to reaching the output of the respectively connected amplifier 36. This is readily accomplished by a suitable low-pass filter formed by a series-connected coil and capacitor 42 and 43. The signals received back at the central station are sorted out in accordance with their respective characteristic frequencies and are used for billing purposes. This is described in greater detail below.

The selection of a group of stations on a branch line to be interrogated is preferably accomplished in the following manner. Each of the transponders 32 on each branch line is provided with a number *n* of frequency-selective circuits and each of these circuits is responsive to a different frequency tone signal selected from a number m of available tone signals at the central station. On each branch line a predetermined number of transponders, called a major group, has the same combination of *n* frequency-selective circuits which are responsive to the same combination or set of *n* tones. There are a number of these major groups on each branch line, each major group having its own particular combination of $n$ frequency-selective circuits which are responsive to a corresponding particular set of $n$ tones. The central station transmits a first set of $n$ tones from the available larger number of $m$ tones and this set of $n$ tones conditions or partially activates the one-major group of transponders on each line having the corresponding combination of frequency-selective circuits for these n transmitted tones. All of the other transponders on a branch line are not affected by the set of n tones so that only one major group of transponders on each branch line is selected for response to subsequent signals.

Within each major group, a so-called final group is wired to have its frequency-selective circuits be responsive to a second set of $k$ selection-signals. The set of k selection signals are transmitted by the central station and is fewer in number than the number in the set of $n$ signals and are preferably chosen from the $n$ tones of the first set.

After the initial selection of the major group of transponders on each branch line by the first set of $n$ tones, the central station transmits a second set of $k$ selection tones. This second set of $k$ tones is used to select for interrogation the final group of transponders within the originally selected major group. Within each major group of transponders on a branch line, the circuits of a certain number (final group) of transponders are made responsive to a predetermined second set of k signals which are used to finally select and activate the transponders in this final group to accept and modify the interrogation signals and to retransmit the modified interrogation signals. Each major group is divided into a number of final groups with the transponders of each final group being responsive to a predetermined second set of $k$ tones.

After the group of stations for interrogation has been finally selected from the major group by the second set of $k$ tones, the central station next sends out interrogation signals which are preferably the remaining tones of the first set of $n$ tones which were not sent out as the $k$ tones of the second set. This allows the same frequencyselective circuits at the station to be used to receive the interrogation signals rather than provide additional circuits. Of course, such additional circuits for receiving interrogation signals of different frequencies may be used, if desired.

The received interrogation signals are modified by the transponders of each finally selected group in accordance with the condition of the respective receiver at each interrogated station and these modified signals are retransmitted back to the central station. Before retransmission, each transponder in the group being interrogated converts the modified interrogation signals into tone signals representative of the particular transponder in the group thereby identifying and distinguishing the station from all others on a branch line.

This selection and interrogation process described above is carried out sequentially for each major group and the different final groups of stations within each major group on each branch line until all of the stations on a line are interrogated. It should be understood that final groups of stations on a plurality of branch lines and having circuits which respond to the same predetermined sets of $n$ and k tones can be interrogated at the same time by the same signals transmitted from the central station. It should be understood that each station on a branch line has frequency selective circuits responsive to a particular set on $n$ tones, thereby establishing that station's major group, and has frequency-selective circuits responsive to a particular second set of $k$ tones, thereby establishing the interrogation or final group for that station.

It can be seen that the selection of each final group of stations to be interrogated is made on the basis of transmitting $n$ out of $m$ tones and then transmitting $k$ out of the $n$ tones. Thus, the number of stations that can be placed on a single line and can be interrogated is the product of the combination of $m$ things taken $n$ at a time, times $n$ taken $k$ at a time. The result is to be further multiplied by the final group size which is the number of different frequency identifying tones assigned to each branch lines.

Figure 3:
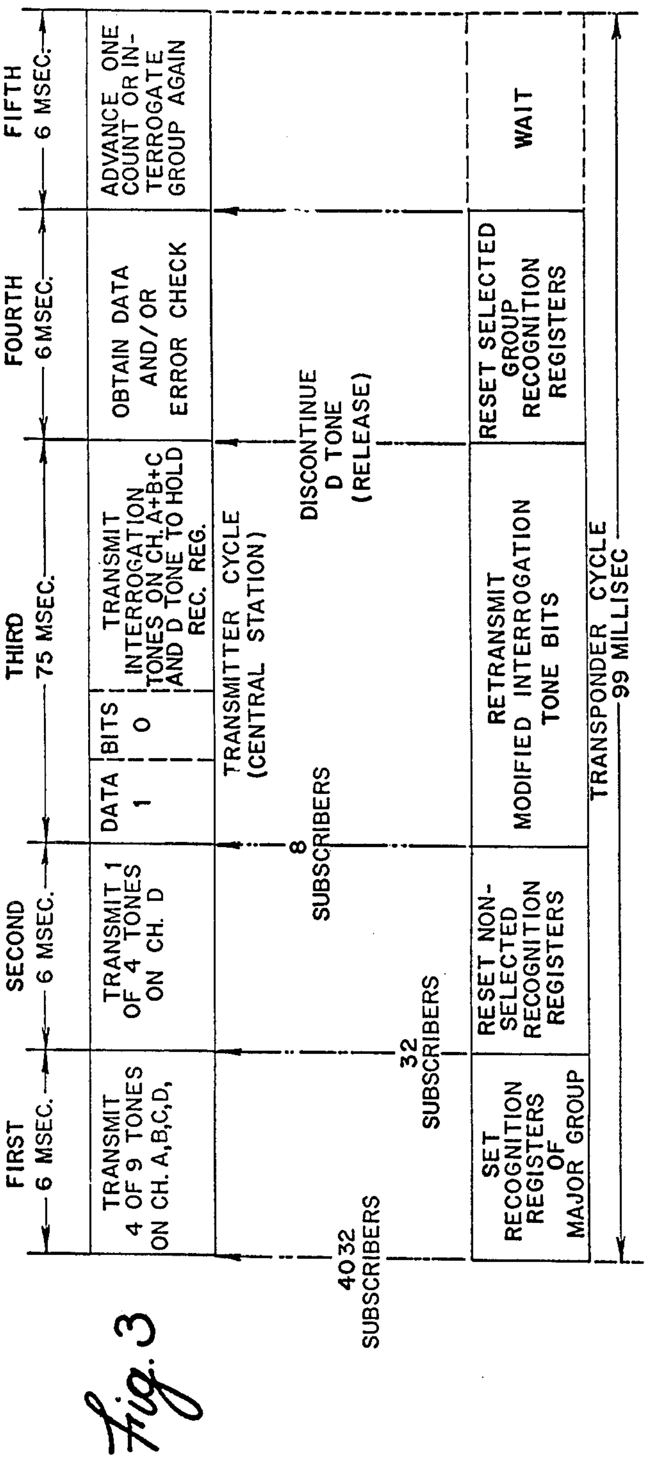
FIG. 3 is a diagram showing the various portions of the interrogation cycle.

FIG. 3 is a timing diagram showing the sequence of operation of the system of the present invention during one complete cycle for selecting and interrogating a final group of stations. Here, the total number of different frequency tones ($m$) available to be transmitted by the central station is illustratively nine. The number of tones ($n$) in the first set transmitted by the central station to select the transponders of the major group of stations is illustratively four. The selection of the final group of transponders is made by a second set of one tone ($k$) and the final group size is eight.

As pointed out before, the total number of subscribers possible on any branch line is the product of the combinations of $m$ things taken $n$ at a time and combinations of $n$ things taken $k$ at a time multiplied by the number of subscribers in each final group to be interrogated at the same time. If the latter is selected to be eight then the illustrated system will have 126 (combinations of nine tones taken four at a time)$\times$ 4 (combinations of four tones taken one at a time) $\times$ 8 (subscribers in a group) = 4,032 subscribers on a branch line.

The above choice of $m$, $n$ and $k$ gives rise to the possibility of placing a total of 4,032 subscribers on a single branch line, out of which 32 subscriber transponders in the major group are selected by the four out of nine tones of the first set transmitted by the central station. From this major group of thirty-two, a final group of eight subscribers is selected by the second set of one tone and then interrogated to retransmit in response to the interrogation signals individual characteristic tone signals representative of the condition of the subscription television receiver at each subscriber station and the identity of the station. It should be understood that as many subscribers as desired may be interrogated simultaneously in a final group as is consistent with the capabilities of the central station equipment for recognizing the identifying tone signals retransmitted by individual transponders in a respective interrogated group. Also, final groups of subscribers on different branch lines may be interrogated at the same time by the same sets of tone signals. As should be obvious, the system described operates with a single branch line and may be repeated for multiple branch lines.

As shown in FIG. 3, during the first portion of an interrogation cycle the central station transmits four ($n$) out of nine ($m$) available tones to all of the subscribers on each branch line. These four tones are respectively labeled A, B, C, D and are transmitted on respective so-called channels A, B, C and D. The other tones E, F, G, H and I available are transmitted over corresponding channels E, F, G, H and I.

The combination of tones A, B, C and D is recognized by those transponders (32 in the example being described) of the subscribers on each branch line, having tone recognition circuits which react only to the combination of tones A, B, C, and D and a recognition register is set and placed in an operative condition in each of these 32 transponders. The recognition registers of the transponders of all the other subscribers on the branch line are not rendered operative since these transponders are provided with tone recognition circuits which react to a combination of tones other than the combination A, B, C and D. These other subscriber stations will therefore not be interrogated during the particular cycle being described but will be interrogated some time later when the tone transmissions from the central station are changed to tones other than the combination A, B, C, D.

The four tones A, B, C and D of the first set may be transmitted continuously and simultaneously or transmitted sequentially and repetitively in a rapid cyclical manner, i.e., A, B, C, D, A, B, C, D, etc., during the first portion of the cycle. In both cases the tones are separated in frequency sufficiently so that they may be readily recognized by the frequency selective circuits of the proper transponders. Typical frequencies for the central station tones are:

| Tones | Frequency (Kilo-Cycles) |
|---|---|
| A | 574.875 |
| B | 637.875 |
| C | 700.875 |
| D | 763.875 |
| E | 826.875 |
| F | 889.875 |
| G | 984.875 |
| H | 1078.875 |
| I | 1173.875 |

In the sequential case the transponder frequency selective tone recognition circuits are also made relatively slow-acting so that each of the repetitively transmitted four tones appears to be a continuous signal at the output of the corresponding tone recognition circuit of the transponder.

During the second portion of the interrogation cycle the central station transmits the second set of one ($k$) tone, which tone is preferably one of the same four tones transmitted during the first portion of the interrogation cycle. This tone is illustratively D in the example being described and the transponders of the eight subscribers in the final group to be selected out of the original selected major group of 32 have circuits which hold their recognition registers in the set or activated conditions in response to this one tone (D). The circuits of the transponders of the other twenty-four subscribers in the selected major group are wired in groups of eight to respond to the other tones, A, B or C in this example, which holds their recognition registers set. Since the A, B and C tones do not occur during the second portion of the interrogation cycle being described the recognition registers of these 24 transponders are reset automatically. Once the recognition registers of these 24 transponders are reset, these transponders are rendered inoperative and unresponsive to the forthcoming interrogation signals which are to be transmitted from the central station. In the example being described a second final group of eight transponders would have their recognition registers left in the set condition by the presence of a C tone as the second set signal; another final group would have its recognition register left in the set condition by the presence of the B tone; and the fourth final group would have its registers left set by the A tone. Thus, successive final groups of eight transponders are selected from within the same major group by using one of the first set tones as the second set tone.

As can be seen, the selection process brought about by the selective transmission of four out of nine and then one out of four tones has the effect of conditioning for interrogation and further response the transponders of only eight subscribers out of the possible total of 4,032 on a branch line. The transponders of all the other subscribers on the branch line are inactive during the time when these eight selected subscribers are being interrogated. By transmitting different combinations of the four out of nine and then one out of the four tones in a predetermined manner the transponders of all 4,032 subscribers on a branch line can be selectively conditioned to be interrogated in groups of a maximum of eight stations. Of course the number of subscribers interrogated in each final group can be increased by providing more transponders, with the same combination of frequency selective circuits and the same wiring to condition the recognition registers in response to the same sets of tones. Each transponder in a final group is also assigned its own characteristic audio identifying tone.

It should be recognized that aby suitable number of tones may be available at the central station and transmitted in any desired numerical combination. For example, the central station may have eighteen tones ($m$) available out of which three ($n$) are transmitted as the first set during the first portion of the cycle and then two tones ($k$) transmitted as the second set during the second portion of the cycle. This permits a total of 4,776 subscribers to be placed on a branch line when the interrogation is to be carried out in final groups of 18 stations. A system of this type needs only three frequency-selective tone-recognition circuits for each transponder.

In the system being described, after the stations in the selected final group of eight subscribers have their respective transponders conditioned to be interrogated, the central station transmits a number of interrogation signals during the third portion of the interrogation cycle. The interrogation signals are preferably those of the n tone signals of the original first set of $n$ signals which were not transmitted as a part of the second set of $k$ tones. In the example, tones A, B and C are available for use as interrogation signals. These tones are preferably transmitted in amplitude modulated form as data bits or pulses commonly called 1 and 0 bits. A 1 bit is designated to correspond to a maximum amplitude carrier and a 0 bit to a minimum amplitude carrier in the present system although the reverse of these designations can be used as is consistent with standard data processing techniques. The 1 and 0 bits are produced by keying the tone signal on and off at the central station, amplitude modulating a continuously produced tone signal or by any other suitable technique. All of these various techniques are conventional in the art and no further description thereof is necessary.

The interrogation data bits or pulses are used at each interrogated transponder to determine the status of the respectively connected subscriber receiver, i.e., to tell to what program the receiver is tuned, whether is it on, or off, etc. To do this, the interrogation data bit signals received at a transponder are modified by logic type circuits in a manner corresponding to the condition of the subscriber's receiver. At each transponder, each modified data bit signal has an identifying tone signal impressed thereon. This identifying tone signal is preferably in the audio frequency range. The modified data bits are retransmitted back over a transmission line to the central station where they are segregated according to the particular subscriber and used for billing or other purposes. Since each of the eight subscribers in the final group being interrogated produces modified data bits with a characteristic audio tone at a respectively different frequency these identifying audio tones of different frequency are readily distinguishable and are separated at the central station so that each subscriber may be billed for the use of his receiver in accordance with the information provided by the data bits retransmitted from his transponder.

The A, B and C tones transmitted as interrogation signals from the central station during the third portion of the cycle are produced in a cyclical pattern. Thus, during one time interval of the interrogating portion of the cycle, provision is made to sequentially transmit tones A, B and C for approximately equal times during this interval. The respective tone is keyed on or is modulated to full amplitude when a 1 bit is to be transmitted and is left off or modulated to minimum amplitude when an 0 bit is to be produced. Thus tones A — produced during an interval (where the presence of the latter indicates production of the tone or full amplitude and the - indicates no production of the tone or minimum amplitude) corresponds to 100; AB - to 110; ABC to 111; etc. In a preferred embodiment of the invention the data bits are transmitted in the form of an error code so that a check can be made at the central station to determine if an error has occurred during the transmission, modification or retransmission of the interrogation signals. As many cyclic repetition of tones A, B and C are produced during the third portion of the cycle as is consistent with the duration of the third portion of the cycle, the amount of data to be transmitted, the data handling capability of the equipment at the central station and the speed of the logic circuits at the transponder. It should also be understood that these data bits can be transmitted as FM, pulse modulation or phase modulation signals in accordance with conventional techniques.

During the third portion of the cycle, tone D is preferably continuously transmitted by the central station. This tone keeps the recognition registers of the final group of stations being interrogated set during reception of the interrogation signals.

During the fourth period of the interrogation cycle the central station does not transmit any tones but instead uses the data retransmitted by the subscriber stations to get billing information. Also, if error codes are used, checks are made at the central station to see if any errors in the data have occurred. Where error checking issued, if an error has occurred then the interrogation cycle for the same final group of eight stations is preferably repeated over again. The repetition is continued until either a correct response is obtained or for a predetermined number of cycles of erroneous responses after which the interrogation of that particular final group is stopped.

During the time that the central station obtains the billing data and/or makes the error check, no D tone is transmitted. Therefore, the recognition registers of the transponders of the previously interrogated final group are reset. If the same final group is to be interrogated again then the central station operates during the fifth portion of the cycle to ready its circuit to produce the same two sets of tones which will again set the recognition registers of the transponders of the same final group of eight subscribers. If the interrogation of the final group was made without error, or if no error check is used, then the central station advances its program during the fifth portion of the cycle to prepare to interrogate the next final group of eight stations. During the shifting of the central station program to the next interrogating cycle all of the transponders on each branch line are in a quiescent state awaiting the first and second sets of selection signals. The advancing of the central station program is preferably accomplished in a manner so that final groups within the same major group are successively interrogated. This means that on the next interrogating cycle the central station will transmit the same first set of four tones A, B, C and D but will change the second set tone from D to either A, B or C. This different second set tone selects a different final group than the one previously interrogated from within the same major group. This successive interrogation of the final groups is continued until all final groups within a major group have been interrogated at which time the central station program changes to transmit a new first set of tones to select a different major group whose final groups are then also successively interrogated.

The time allocated for the various portions of the interrogation cycle may be allotted as needed and as desired. Typical values shown in FIG. 3 are for a system in which there are 4032 subscribers on a branch line, and are as follows:

| Portion of Cycle | Purpose | Time |
|---|---|---|
| 1 | Transmit first set of tones condition major group | 6 milliseconds |
| 2 | Transmit second set of tones condition selected final group | 6 milliseconds |
| 3 | Transmit interrogation signals Retransmit from selected transponders | 75 milliseconds |
| 4 | Error check — reset registers | 6 milliseconds |
| 5 | Advance central station one count — wait at all transponders | 6 milliseconds |

It should be understood that these time values are given for illustration purposes only and any suitable time may be allotted for each portion of the cycle, as desired. Where, for example, 1 Kc. logic circuits (i.e., the data bits are one millisecond long) are used at the transponda, seventy-five data bits can be transmitted during the third portion of the cycle. Of course the number of bits increases as the speed of the logic circuit is increased with nanosecond ($10^{-9}$ second) logic circuits being currently available commercially.

Figures 4A, 4B:
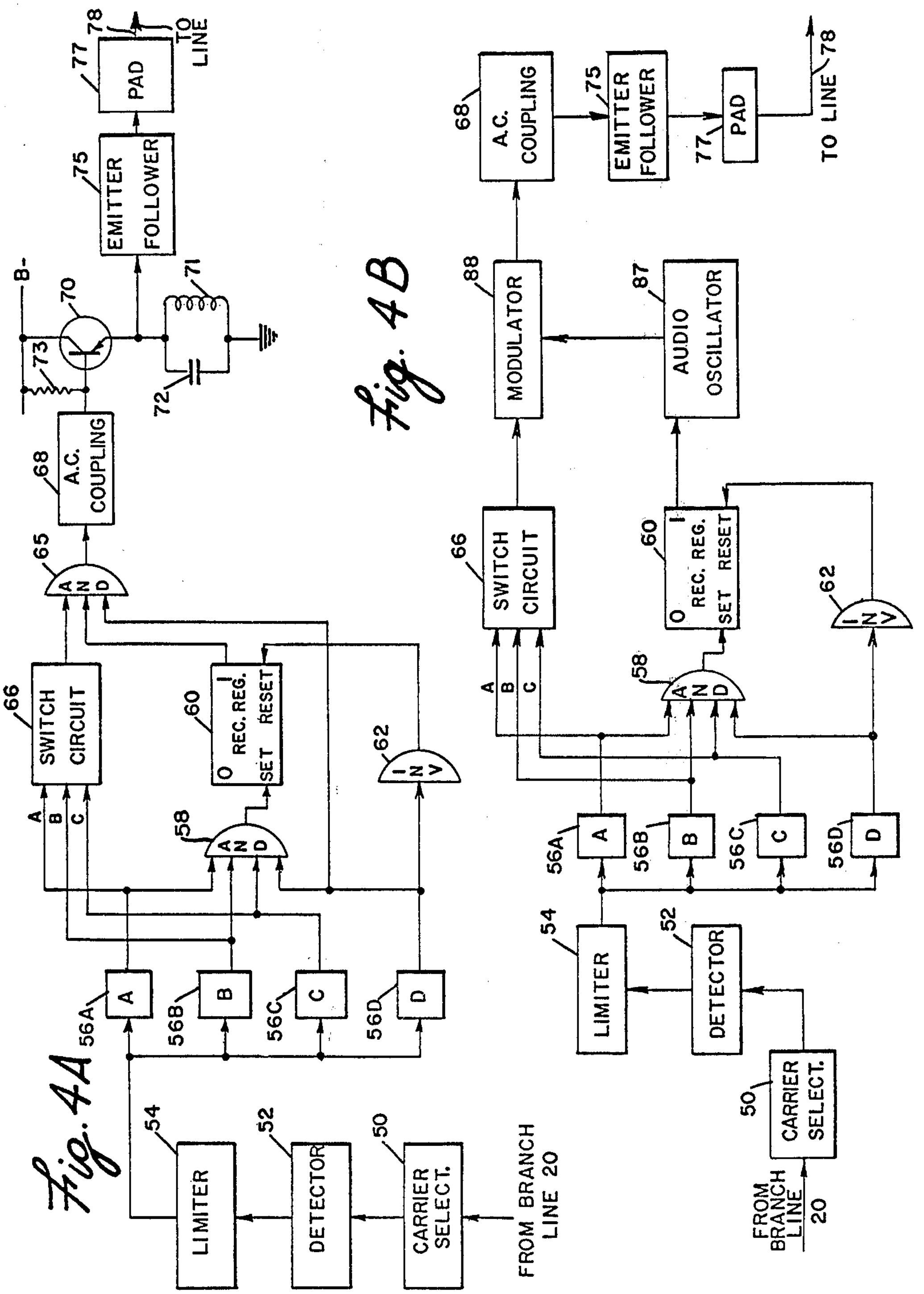
FIGS. 4A, 4B and 4C are schematic diagrams of various embodiments of transponders made in accordance with the present invention.

FIG. 4A shows a preferred embodiment of a transponder unit for use at each subscriber station. The sigals transmitted from the central station during an interrogating cycle over a coaxial branch line 20 are received at a subscriber station and applied to a carrier selector 50 in the transponder. This carrier selector is a bandpass filter which is tuned to pass the frequency bandwidth of the carrier on which the selection and interrogation signals are modulated and transmitted from the central station. It should be understood that the carrier selector 50 rejects all other signals, such as the video and music signals, on the coaxial line and keeps these latter signals out of the transponder.

The output of carrier selector 50 is connected to the input of a detector 52 which demodulates the tone signals from the carrier wave on which they are modulated. The detector 50 is of the FM or AM or other suitable type depending upon the type of transmission being used by the central station. This operation is conventional in all FM or AM receivers. The output signals from the detector 52 are then applied to a limiter circuit 54 which clips the tops of the received tone signals to make them all of equal amplitude.

The output of the limiter 54 is applied to the parallel connected inputs of four tone detectors designated 56-A, 56-B, 56-C and 56-D in the transponder being described to correspond to the A, B, C and D tones of the first set. Each tone detector 56 is a sharply tuned bandpass filter which is responsive only to the corresponding particular frequency tone signal. Each tone detector also preferably has a suitable detector circuit therein, such as a diode and the other conventional associated components, to recover the amplitude modulated envelope of the transmitted tone signals. Thus, the outputs of the tone detectors are D.C. signals of maximum amplitude 1 bit corresponding to the clipping level of limiter 52 when a tone is received or of minimum amplitude (0 bit) corresponding to the absence of a tone signal. The data bits from the central station also appears as maximum and minimum amplitude D.C. signals corresponding to a 1 (maximum tone carrier) or a 0 (minimum or no tone carrier).

The bandpass filters for detectors 56 may be any suitable device such as a crystal filter, inductance capacitance filter, etc. In the transponder being described the tone detectors are present to respectively pass the frequencies corresponding to tone signals A, B, C and D. It should be understood that in the illustrative system being described each subscriber's transponder is supplied with four tone detectors to respond to a particular combination of four tone signals and to be unresponsive to any other combination. On any one branch line all subscribers in the same major group (in the example there being 32 subscribers in a major group) have the same combination of tone detectors 56. Other major groups of 32 subscribers have other combinations of four tone detectors for four tones of different frequencies.

Where the four tones of the first set are to be cyclically rather than continuously transmitted by the central station, the circuits of the tone detectors 56 are preferably made to be slow reacting so that the cyclically transmitted tone signals appear as a relatively steady signal at each tone detector output. Thus, while only relatively short pulses of tones A, B, C, D are transmitted, the time constant of each tone detector is made substantially equal to the time between two successive tones of the same frequency so that each detector effectively has an output signal during the interval between two successive tones of the same frequency. In the preferred embodiment of the invention being described the respective tones of the first set of *n* selection tones are transmitted continuously and simultaneously during the first portion of the interrogating cycle and the second set transmitted continuously during the second portion of the cycle. During the third portion of the cycle the tone or tones used to keep the recognition register set are transmitted continuously while the other tones used as interrogation signals are selectively and cyclically transmitted as the data bits.

The outputs of the four detectors 56 are connected to an AND gate 58 which has four inputs, one for each detector. The AND gate is of conventional construction and produces an output (1) signal upon simultaneous occurrence of 1 signals at all four inputs.

When all four tones A, B, C, D are received, AND GATE 58 is conditioned and produces an output (1) pulse which is applied to the "set" input of a recognition register 60, which is a conventional flip-flop circuit. The pulse applied to the "set" input sets the register so it produces an output (1) pulse at its right hand output.

When one or more of the four tone signals from the central station does not correspond to the tone selection frequencies of the four tone detectors 56 in a transponder, then the AND gate 58 in that transponder is left unconditioned. This means that AND 58 does not "set" the recognition register 60. When register 60 is not set, any signals subsequently coming down the coaxial branch line during the interrogation cycle have no further effect on the operation of the station's transponder.

Consider that the recognition register 60 is "set" during the first portion of an interrogation cycle by recaption of the first set of four tones A, B, C and D. During the second portion of the interrogation cycle, three of the four tones are removed by the central station so that a second set of one tone is received by the transponder. In the example being described the one tone left is D. The output of tone detector 56-D is connected to the input of a conventional inverter circuit 62. When the inverter receives no input (0 bit) signal it produces a 1 pulse or bit output signal and when it receives an input (1 pulse or bit) signal it produces a 0 bit output. The output of inverter 62 is connected to the "reset" input of the flip-flop forming the recognition register 60.

If during the second portion of the interrogation cycle a tone or tones other than D is received by the transponder then the inverter has a 0 bit input and produces a 1 bit output. This 1 bit output resets the recognition register 60 thereby causing a 0 bit to be produced at its right hand output. If the transponder receives a D tone then the inverter has a 1 bit input and produces a 0 bit output. The 0 bit does not reset the register 60 so the 1 bit signal still appears at its right hand output.

Where two or more tones are transmitted as the second set of signals the inverter 62 is replaced by a conventional NAND circuit which is an AND gate with one stage of signal inversion. In the absence of one or more of the signals in the second set, the NAND circuit produces a pulse (1) for application to the "reset" input of register 60 to reset it.

Out of the original major group of 32 subscribers only eight have their transponders wired to have the inverter 62 produce no output signal in response to the D tone during the second portion of the interrogation cycle. Therefore at the other 24 subscriber stations in the major group which responded to the A, B, C and D tones the recognition registers are reset even though they were originally set upon receipt of the first set of four tones. The resetting occurs by the operation of the inverter circuit 62 which produces a pulse to turn the recognition register 60 "off." When this happens the interrogation pulses transmitted during the third portion of the interrogation cycle from the central station have no effect on the transponder. As can be seen, the final selection of the group of eight subscribers to be interrogated is made out of the major group of 32 subscribers by using the second set of tones. Of course, if the recognition register of a transponder was not "set" during the first portion of the cycle, the tone (D) transmitted during the second portion can not set it because it is coupled to the "reset" side of the recognition register 60.

When the interrogation signals are transmitted from the central station as tones A, B, and C during the third portion of the interrogation cycle, tone D is also transmitted to keep the recognition register 60 set. The D tone must be transmitted to keep the inverter circuit 62 from producing an output pulse which would reset register 60. When the inverter circuit receives the D tone and register 60 is originally set, the register will remain set during the third portion of the cycle so that the transponder responds to the interrogation signals from the central station. Again, this operation would apply to a NAND circuit in place of the inverter if two or more tones are used to keep the register set. Where two or more tones out of an available four tones are used to keep the register set the number of tones available for use as interrogation signals at the same time is diminished. This might be acceptable in some cases since the use of additional tones to keep the register set enhances the security of the system, i.e., makes it harder to cause the transponder to become actuated. Of course, the number of tones in the first set transmitted by the central station can be increased thereby making available a greater number of tones for selection and interrogation purposes.

The set output signal from the right hand side of the register 60 is applied to one input of a three input AND circuit 65. One of the other inputs of the AND circuit 65 receives the output signal from the D tone detector 56-D. For all practical purposes the output signal of the D tone detector is continuous so that the AND gate 65 is able to be conditioned to produce output pulses upon receipt of either A, B or C tones from a switch circuit 66 during the entire period of transmission of interrogation signals. Where two or more continuous tones are to be used to keep the register set during the third portion of the cycle, these tones would also be applied to inputs of AND circuit 65.

The interrogation signals transmitted from the central station as sequential and cyclical pulses of tones A, B, and C are detected by the respective tone detectors 56-A, 56-B and 56-C. As explained previously, these interrogation signals correspond to 1 and 0 data bits. This interrogation signal data bits at the outputs of the respective tone detectors 56-A, 56-B and 56-C are applied to a switch circuit 66. As is described below, the switch circuit contains logic circuits to modify the applied data bits in accordance with the condition of the receiver being monitored at the subscriber station. These modified data bits at the output of the switch circuit 66, which were originally the A, B and C tones, are applied to the third input of AND circuit 65.

Upon a 1 data bit or pulse passing through the switch circuit 66, the AND gate 65 is conditioned and produces a corresponding 1 bit or pulse output signal. This 1 bit output signal is applied in the circuit of FIG. 4A through an AC coupling circuit 68 to the base of a PNP transistor 70. A parallel-resonant circuit formed by a coil 71 and a capacitor 72 is connected between the emitter of the transistor and ground. The collector of the transistor is connected to a suitable source of B- potential (not shown) and the base is biased in the forward direction by resistor 73.

The application of a 1 bit signal which is illustratively of positive polarity, to the base of transistor 70 cuts it off abruptly. The sudden removal of current from the transistor causes the parallel-resonant circuit to ring and produce an output ringing pulse of substantially the same duration as the input data pulse. However, the output pulse is now at a tone frequency whereas the input pulse was essentially D.C.

In this manner each data bit 1 pulse passing through the coupling circuit 68 causes the transistor to produce a ringing pulse. This ringing pulse also corresponds to a 1 bit. The parameters of the parallel-resonant circuit are selected to produce a characteristic tone for the ringing pulses produced by each transponder and each transponder in a final group of eight has a different parallel-resonant circuit so that different tones are produced for the different transponders of the final group.

Typical ringing tone frequencies which may be used for a final group of eight subscribers are shown in the table below:

| SUBSCRIBER | FREQUENCY (Cycles per second) |
|---|---|
| 1 | 595 |
| 2 | 765 |
| 3 | 935 |
| 4 | 1105 |
| 5 | 1275 |
| 6 | 1615 |
| 7 | 1955 |
| 8 | 2380 |

Thus the interrogation data bits from the central station, which originally appeared as tones A, B and C, are shifted to a new frequency by the ringing circuit at each transponder. All of the ringing tones produced by one transponder (whether by response to tone A, B or C pulses) are of the same frequency, which frequency is normally made different from and lower than the frequencies of tones A, B, C, or any of the other selection tones available at the central station. As shown in the table above, the tones produced by the ringing circuits are preferably in the audio range.

If a 0 bit is present at the output of the switch circuit 66 no ringing pulse is produced since transistor 70 remains in a conductive state. Thus, 1 and 0 data bits in the form of tone pulses are produced by transistor 70 for retransmission to the central station.

While a PNP transistor has been shown and it has been assumed that the 1 bit signal is of positive polarity to cut the transistor off, it should be understood that an NPN transistor and negative polarity may be used for the 1 bit signals. This substitution is conventional in the art.

The output audio tone pulses are taken from the emitter of the transistor 70 and applied to an emitter-follower amplifier 75. The amplifier 75 is of conventional construction and, like the other components of the system, is preferably a solid-state device such as a transistor. Amplifier 75 has a relatively low output impedance so that the ringing pulses may be readily applied back onto the branch line 20 or a separate transmission line 78 such as a telephone line, through an attenuator and matching pad 77. These ringing pulses are retransmitted back to the central station of the transmission line.

Figure 5:
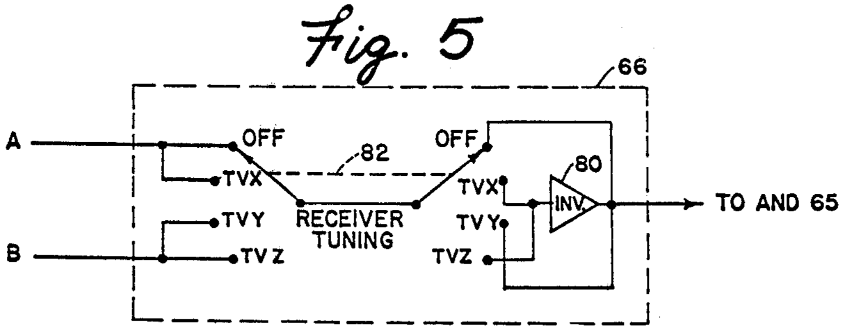
FIGS. 5 and 6 are schematic diagrams of different types of reply circuits for operating logic circuitry to modify the interrogation signals received from the central station.
Figure 6:
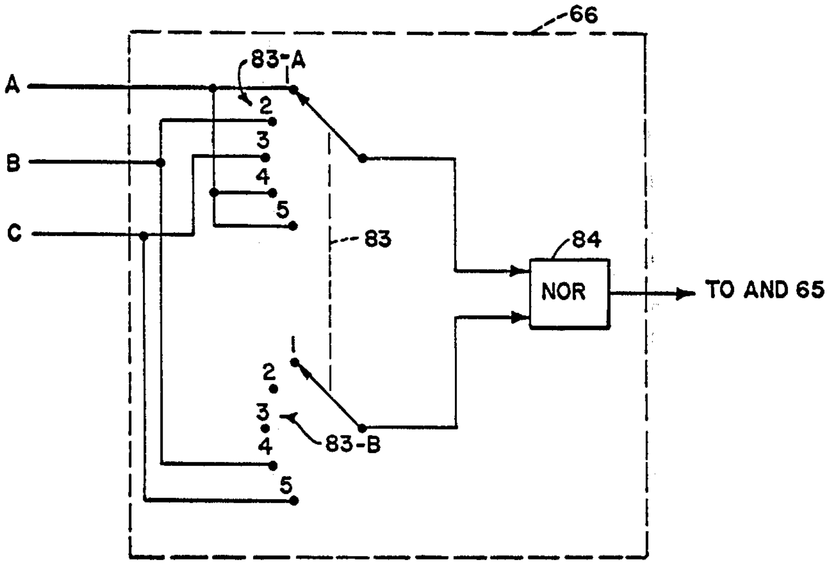

FIGS. 5 and 6 show different types of switch circuits 66 used to modify the received interrogation signals at a transponder in accordance with the condition of the television receiver at that station.

FIG. 5 shows a circuit for producing four different modifications of the received interrogation bit signals on channels A and B only. In this example the C tone is not used for interrogation purposes. These four possible modifications are signals produced corresponding to the subscriber's receiver being "off," tuned to television channel X, television channel Y or television channel Z. This circuit has an inverter amplifier 80 and a two deck, double-pole, multi-position switch 82. The input deck of switch 82 receives the A and B tone pulses from the outputs of the the corresponding detectors, 56-A and 56-B. Tone A signals are applied to the OFF and TV-X positions while tone B signals are applied to the TV-Y and TV-2 positions. The two arms of the switch are moved by the subscriber as he tunes the receiver to one of the subscription service program channels. The output of the inverter 80 is connected to an input of the AND circuit 65 whose output is connected to the base of transistor 70 to supply the signals for producing the ringing pulses. The appearance of a tone pulse (1 bit) at the output of the inverter 80 causes a ringing pulse to be produced while the absence of a tone pulse (0 bit) results in no ringing pulse.

When switch 82 is in the "OFF" position, meaning that the receiver is off, the bits received as A tones are transferred directly to the output of the inverter in their original or true logic form, called A here. This means that 1 and 0 bits at the switch input appear in time 1 and 0 bit form at the output. With the switch in the TV-X position, the receiver being tuned to television channel X, the A tone signals are applied to the inverter input and the logic complement $(A^-)$or inverse of the A bit signals is produced at the inverter output. This means that an input 1 bit A tone will now be a 0 bit while a 0 bit A tone input will give a 1 bit output. Similarly, with switch 82 in the TV-Y position, the receiver being tuned to television channel Y, the original or true B bit signals are transferred to the output of the inverter. With the switch in the TV-Z position, the logical complement B of the B bit signals is produced at the inverter output.

Thus in the switching circuit of FIG. 5 there are four possibilities of modified signals at the output of the transponder corresponding to the interrogation signals originally received from the central station. Each modification corresponds to a predetermined condition of the receiver at the subscriber station and since the modifications are performed by logic circuits, they may be considered to be logical modification. The term logical modification means the production of true, complementary or combination of true and complementary signals. Thus, circuits can be provided for the switch 66 which invert one or both of the applied signals, performed AND, NAND, OR, NOR functions or combinations thereof, in response to the movement of the switch.

Since only A and B tones and a single inverter are used in the switch of FIG. 5, only four logical output signals can be produced. FIG. 6 shows a switching arrangement for producing five logically modified outputs in response to the three tones A, B and C. Here, a two-deck, five-position, wafer switch 83 is used and the movable wiper arm of each deck 83-A and 83-B is connected to an input of a conventional NOR circuit 84. This circuit performs an OR function with one stage of signal inversion. The A interrogation tone signals are applied from detector 56-A to contact positions 1, 4 and 5 of deck 83-A, while the B tone signals are applied to contact position 2 of deck 83-A and position 4 of deck 83-B. The C tone signals are applied to position 3 of deck 83-A and position 5 of Deck 83-B.

The logically modified outputs for each of the switch positions in response to the input data bits are as follows:

| Switch Position | Output |
|---|---|
| 1 | A |
| 2 | B |
| 3 | C |
| 4 | A+B |
| 5 | A+C |

These output signals are applied to one input of the AND circuit 65 and then to the base of the transistor 70 to produce the ringing pulses in the manner previously described. Again, any combination of true and/or complementary signals may be produced in response to the three tone signals upon provision of the proper logic circuits. For example, if the wiper arm of deck 83-A is connected to an OR circuit and the wiper arm of deck 83-B to a NOR circuit then the combined outputs of these two circuits for the five switch positions would be A; B; C; $A+\bar{B}$, $A+\bar{C}$. Many other types of logical modifications are possible, as should be apparent.

It can be seen that the interrogation signals from the central station are retransmitted in logically modified form back to the central station. This means that the transponder does not have to have the capability of generating its own data code corresponding to the condition of the receiver. Instead, the data code is produced at the central station and is only logically modified by the transponder in accordance with the condition of the receiver. Also the interrogation signals are coded in terms of an audio frequency to identify a particular subscriber within a final group of interrogated subscribers. This is a relatively simple arrangement for providing a considerable amount of data as to the identity of the station and the condition of its associated receiver.

In a preferred embodiment of the invention the interrogation signals are transmitted in the form of codes which may be checked at the central station for errors. These errors might occur in either the transmission of the interrogation signals to the subscriber station or in the retransmission back to the central station. They are caused by noise, faulty equipment, etc. There are many suitable codes available for this function. One typical code for detecting errors represents a 1 bit as a sequence of three bits 010 while a 0 bit is represented as a sequence of the three bits 101. The coded bits representative of the 1 and 0 bits may be transmitted as all A tones, all B tones or combinations thereof. This depends upon the type of switch circuit 66 used since the coded bits received by a transponder are logically modified in accordance with the setting of the switching circuit 66. For example, a sequence of bits 101 produced by the combination of tones A and B (A,B,A) and representative of a binary 0, is modified to 010 when switch 83 of FIG. 6 is in the number 4 contact position. Other logical modifications of the interrogation bit signals occur corresponding to the setting of the switch circuit 66 and the retransmitted coded bits are checked at the central station against the possible logical modifications of the originally transmitted interrogation bits by using conventional error checking techniques.

FIG. 4B shows a modified type of transponder in which the production of the characteristic transponder identifying tone pulses in response to the interrogation signals is accomplished in a different manner than in FIG. 4A. The same reference numerals are used to identify the corresponding components as with the transponder of FIG. 4A. Here again the first set of received tones A, B, C and D sets register 60 and the register is left set in response to the second set of tones comprising tone D. When register 60 is set, an output is produced which gates "on" an audio tone oscillator 87. Tone oscillator 87 produces a signal of a characteristic frequency to identify the particular transponder in the group being interrogated. This oscillator preferably has good frequency stability and may be crystal controlled. The oscillator 87 is preferably turned "on" by applying the output signal from register 60 in proper polarity to an electrode of a normally cut-off conventional transistor audio oscillator to establish a forward bias condition under which the transistor oscillates. For example, if an NPN transistor oscillator is used a positive-polarity gating signal is applied to the base electrode, assuming that the collector is biased positively with respect to the emitter.

The output signal of oscillator 87 is applied to a conventional modulator 88 where it is amplitude-modulated by the modified interrogation bit signals at the output of switch circuit 66. A 1 bit applied to the modulator 88 produces an audio tone signal of a first amplitude, preferably maximum, at the modulator output while a 0 bit produces a modulator output signal of a second amplitude, preferably minimum. If needed, an inverting amplifier may be provided between the output of switch 66 and the input of the modulator to produce the proper polarity for the 1 and 0 bits to obtain desired amplitude modulation output from the modulator. The amplitude-modulated tone signals are applied to the emitter follower 75 and matching pad 77 to the line 78.

The AND circuit 65 of the transponder of FIG. 4A is omitted from the transponder of FIG. 4B. However, no audio tone pulses can get through the line 78 unless the register 60 is kept set by the D tone at the inverter 62. If the D tone is absent during the transmission of the interrogation signals the audio oscillator is gated "off" since the registor would be reset through the inverter 62.

Figure 4C:
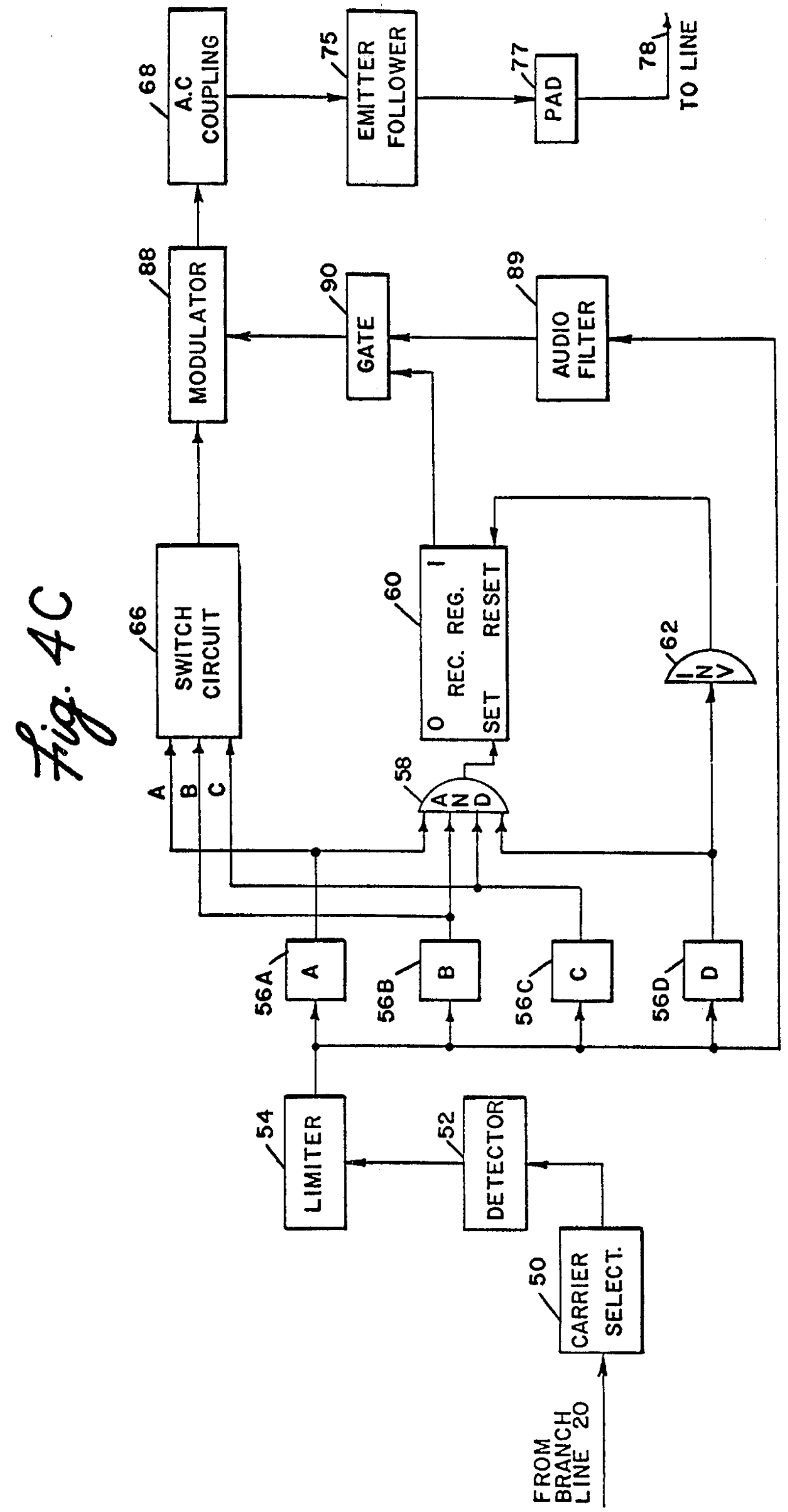

FIG. 4C shows another type of transponder which can be used with the system of the present invention. Again, the same reference numerals are used for the same components as in the transponders of FIGS. 4A and 4B. The transponder of FIG. 4C is similar to that of FIG. 4B, the major distinction being that now the characteristic identifying audio tones are produced at the central station instead of at the individual transponders by the ringing circuit of FIG. 4A and the audio oscillator of FIG. 4B.

For operating the transponder of FIG. 4C, the central station transmits on the branch line 20 the eight characteristic identifying audio tones simultaneously and continuously during the third portion of the interrogation cycle at the same time that the interrogation bit tone signals are being transmitted. The eight identifying audio tone signals are modulated onto the carrier transmitted from the central station along with the interrogation signals, which are of different frequency. The eight audio tones are detested by detector 52 at the transponder of FIG. 4C along with the interrogation tone signals and the eight audio tones are applied from the output of limiter 54 to an audio frequency filter 89. It should be clear that none of the detectors 56 can pass any of the eight audio tones because of the difference in frequency between the audio tones and the selection interrogation tone. Each transponder in a final group has a filter which selects and passes only a respective one of the eight received audio tone frequencies to one input of a gate circuit 90. The gate circuit 90 is gated open upon the register 60 being conditioned by the second set of selection tone signals (D). The gate circuit 90 may be of any conventional type, for example, a transistor which is biased to be nonconducting until the signal from the register 60 establishes a forward bias, at which time the audio signal will pass therethrough. The selection of the final group of stations is accomplished in the manner previously described.

When gate circuit 90 is conditioned, it passes the continuous single identifying audio tone signal to one input of the modulator 88 whose other input receives the modified interrogation bit signals from the output of switch circuit 66. The output of the modulator 88 is an audio tone which is amplitude-modulated in accordance with the 1 and 0 bits present at the modulator input. This is described with respect to the transponder of FIG. 4B. The amplitude-modulated audio tone is passed through the A.C. coupling circuit 68 to the emitter follower 75 and then through the pad 77 to the line 78.

It should be clear that the transponder of FIG. 4C needs no circuits for producing the audio identifying tone for retransmission back to the central station. Instead, the audio tone is produced at the central station and selected by the filter 89 of the transponder for modulation by the modified bit signals. This arrangement has several advantages, among them being the replacement of a transistor ringing or oscillator circuit with a passive filter device. Additionally, the possibility of having the ringing circuits or oscillators at the transponders drift, thereby giving rise to a source of potential error in the billing information, is eliminated since highly stable audio oscillators can be provided at the central station. The central station oscillators can be carefully controlled by using crystals, heaters and other standard techniques.

Each of the transponders shown in FIGS. 4A, 4B and 4C also preferably includes a suitable tuning unit such as that formed by local oscillator and mixer circuits for converting the program information received over line 20 to a frequency which can be used by a conventional television receiver. In a preferred embodiment of the invention the tuning unit takes the incoming signals and converts the various carrier frequencies to the frequency of a selected UHF or VHF television channel which is not being used in the area in which the system is operating. Converters for accomplishing this are conventional in the art and no further description thereof is needed. The converted output signal is then applied from the output of the transponder tuning unit to the antenna input terminals of a conventional television receiver which is tuned to this unused channel. The television receiver then operates in the normal manner to reproduce the video and/or sound information applied to its antenna input terminals.

The switches 82 and 83 shown in the circuits of FIGS. 5 and 6 are preferably part of the switching arrangement of the transponder tuning unit and are, for example, added wafers on the tuning unit program selector switch having the same designated switch positions shown in FIGS. 5 and 6. Thus, as a subscriber wants to operate his receiver to reproduce subscription programs, he first turns his receiver to the selected unused channel and then turns the selection switch on the tuning unit to the desired program, e.g., TV-X, TV-Y, TV-2, etc. The transponder tuning unit converts the selected incoming program carrier to the frequency of the selected unused receiver channel and the program information is reproduced by the receiver. At the same time the tuning unit selector switch operates the switch of the switching circuit 66 to control the modification of the data bit signals. The transponders operate in the manner previously described.

Where the subscriber television receivers are to receive only subscriber programs and not commercial programs, the tuning unit of the receiver is preferably constructed to convert the subscriber program into the proper intermediate frequencies for operation of the receiver. This eliminates the need for the separate tuning unit in the transponder. In this arrangement an added wafer is provided for the switches of switching circuit 66 to convey the program signals from line 20 to the receiver antenna input terminals.

Figure 7:
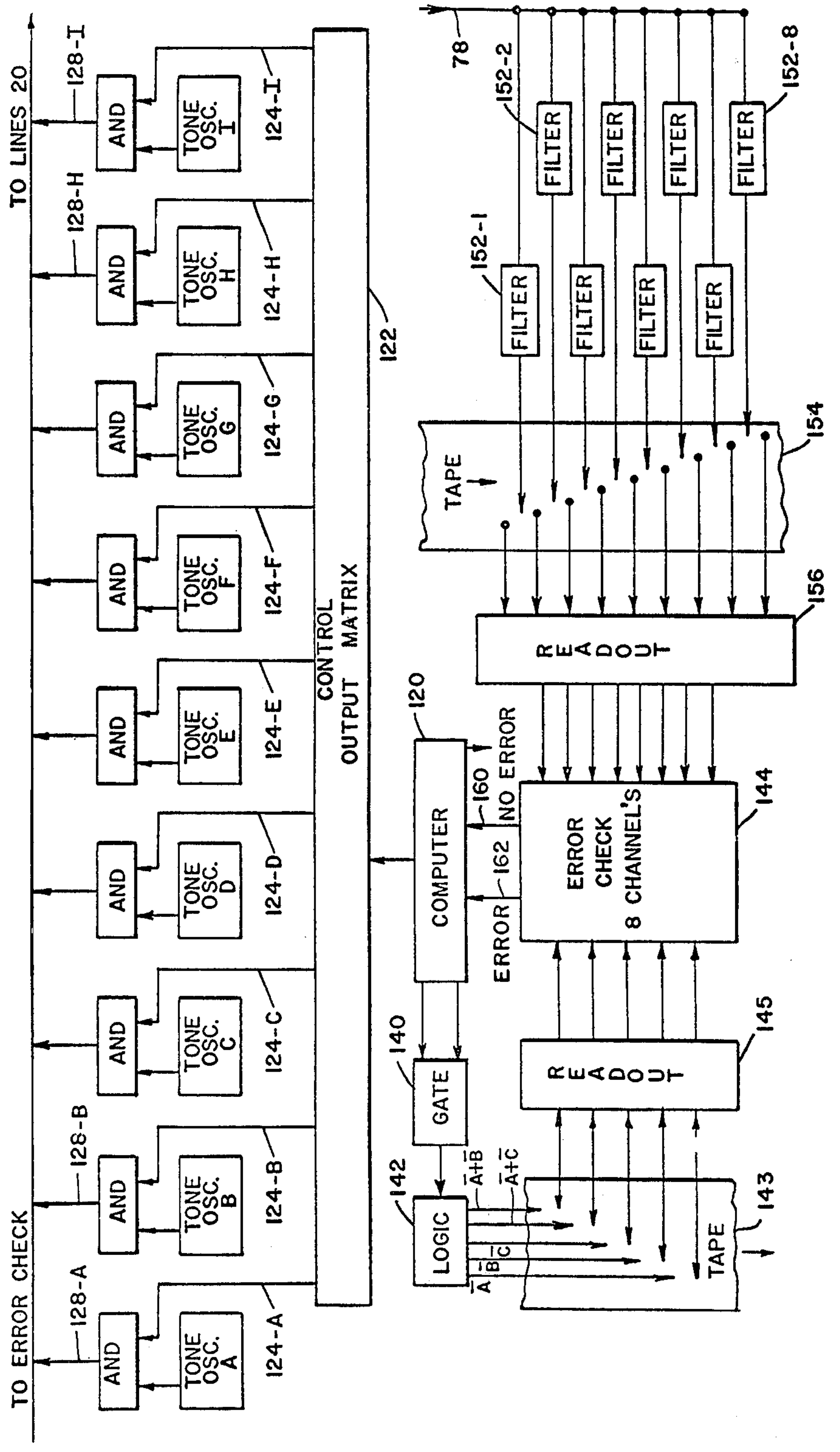
FIG. 7 is a schematic block diagram of one form of central station.

FIG. 7 is a schematic block diagram of the control and billing portions of the central station. A computer 120 is provided which is programmed to control the production of the selection and interrogation signals and also to actuate the billing mechanism. One such computer may be provided for each branch line 20 or one computer used to control the interrogation of all the branch lines. Any suitable computer may be used and it, in itself, forms no part of the present invention. FIG. 7 shows an arrangement for use with one branch line to interrogate stations in final groups of eight. This arrangement is repeated as needed fro additional branch lines.

One output of the computer 120 programmer operates an output control matrix 122 with nine output leads 124-A, 124-B, . . . 124-I. Each of these leads is respectively connected to one input of a respective AND circuit 128-A, 128-B . . . 128-I. The other input of each AND circuit 128 is the output of a respectively connected tone generator 126-A, 126-B . . . 126-I. Each of the tone generators 126 continuously produces a different one of the m frequency tones A, B, C, etc.

The computer 120 controls the production of the selection and interrogation signals during the various portions of the interrogating cycle. To do this the AND gates 128 are selectively conditioned corresponding to the tones to be produced during each portion of the interrogation cycle. In the illustration previously described where $m = 9$, $n = 4$ and $k = 1$, four AND gates are conditioned to pass tones during the first portion of the cycle and one AND gate out of the first four conditioned during the second portion of the cycle. During the third portion of the cycle the computer selectively conditions three of the first four conditioned AND gates 128 to transmit the desired sequence of interrogation pulses while the other AND gate 128 is conditioned to continuously pass the tone used to keep the recognition registers of the selected transponders set. As shown, the outputs of the AND gates 128 are connected to a single output line which is in turn connected to the transmitter 35 of FIG. 1 and then to the respective branch lines 20.

Where error checking is to be used, the interrogation signals produced by the computer 120 during the third portion of the interrogating cycle are also applied through a gate 140, which is opened by a gating signal from the computer only during this third portion of the cycle, to a logic circuit 142. The logic circuit 142 produces a number of output signals corresponding to the various possible modifications of the data codes that can be produced by the switch circuits 66 at the transponders. Thus, in the example of FIG. 6 previously described where five logical modifications of the code are produced using the tones A, B and C, the same five logical code modifications are produced at the output of the logic circuit 142. These are respectively $\overline{A}$, $\overline{B}$, $\overline{C}$, $\overline{A}+\overline{B}$ and $\overline{A}+\overline{C}$. All of these signals are recorded on tape, punched cards or other suitable medium 143 for application to an error check circuit 144 by a suitable readout device 145. If desired, all of the various possible modifications of the tones can be pre-recorded thereby eliminating the need for the logic circuit 142 and gate 140.

The characteristic audio tone pulses corresponding to the logically modified bits which are retransmitted by each subscriber station of a particular final group during an interrogation cycle are separated from transmission line 78 and applied to the inputs of a bank of filters 152-1, 152-2, . . . 152-8. Each of the filters 152 separates out and passes the audio tone corresponding to a particular subscriber station in the group being interrogated. The data bit pulses retransmitted by each subscriber station are passed through the respective filter 152 and recorded on a suitable medium 154 such as magnetic tape or punched cards during the third portion of the interrogated cycle. A separate channel is recorded to correspond to each station in the group. The information available on medium 154 is the billing information which is used to determine the charges to be made to each subscriber. This billing information is utilized by any standard computer data processing technique.

Where error checking is to be used, after the third portion of the interrogation cycle is completed a suitable readout means 156 reads out the recorded signals on medium 154. The reproduced signals of each recorded channel are applied to the error checking circuit 144 and matched against the possible logical code modifications of the originally transmitted interrogation signals. If there is a match for each of the reproduced channels then a signal is produced at the output 160 of the error checking circuit 144 to indicate "no error." At this time the information on medium 154 is verified as being accurate for billing purposes. The "no error " signal advances the computer 120 by one step and the next group of subscriber stations is interrogated in the manner previously described. If there is an error in the checking of any one of the channels then a signal is produced on error output line 162 and the interrogation cycle for the particular group of subscriber stations is repeated. At the same time, the information on medium 154 is either erased or marked as being inaccurate so it will not be used for billing. If desired, a separate error signal may be produced for each channel so the identity of the station producing the error can be readily determined.

After a predetermined number of repetitions of the interrogation cycle for any one group in which an error occurs, the computer automatically moves on to interrogate the next group of stations. The same group of stations originally giving rise to the error is interrogated again at a later time to see if the error persists. If the error does persist then an indication is given that something is wrong with one of the subscriber stations in that particular group and a physical check is made in the faulty transponder or transponders at a later time.

It should be understood that the central station of FIG. 7 may be considerably simplified by not making an error check. If the error check is omitted, then components 140, 142, 143, 144, 145 and 156 are not needed. In this arrangement the computer automatically advances to interrogate the different groups and the billing information is taken off medium 154 unverified.

After one final group has been interrogated in the manner described above, the computer program advances to interrogate another final group. The same steps described above are taken to select, interrogate, obtain the billing information, and make the error check if the latter is to be done. The interrogation is preferably done by selecting successive final groups in a major group, then moving on to another major group and successively interrogating its final groups. This is continued until all the final groups on a branch line are interrogated.

The central station shown in FIG. 7 is for use with the transponders of FIGS. 4A and 4B. It may be easily adapted to be used with the transponder of FIG. 4C upon provision of the eight audio tone oscillators which are gated on to produce output signals during the third portion of the interrogation cycle. This gating signal is produced by the computer as part of its program. The eight audio tones are then modulated onto the same carrier used for the selection and interrogation signals for transmission over the branch lines 20 to the subscribers.

While the interrogated transponder arrangement of the present invention has been particularly described as being used to interrogate pay TV subscriber stations it should be understood that the transponders may be used with and the switch circuits 66 may be actuated by other types of equipment. For example, a transponder may be used at each of a number of subscriber radio stations in which case the tuning of a station controls the switch circuit. Also, the transponder system may be used with a number of television receivers for audience survey purposes to determine program popularity ratings. Other uses include the monitoring of a number of gauges and meters whose output readings control the switch circuit. Many other uses are possible in which it is desired to selectively interrogate individual or groups of stations to monitor the condition of apparatus located there.

It should also be understood that the system described can operate on a radio wave transmissiion basis instead of using the closed circuit branch lines 20. Here, the central station transmits the program, selection and interrogation signals which are received at the transponder by a conventional AM, FM or other type of receiver. After demodulation, these signals are used to select and interrogate the transponders, in the manner previously described. The modified signals retransmitted by the transponders can be applied to a transmission line for return to the central station or the transponder can be provided with a transmitter to transmit the modified signals back to the central station after modulating an AM, FM or other type carrier wave.

As pointed out above, one of the advantages of the transponders made in accordance with the present invention is that no control device is needed at the transponder to generate long complicated codes to transmit data. Instead, these codes are produced at the central station. This feature finds particular use in such applications as aircraft or other vessel I.F.F. (identification-friend-or-foe) systems where previously the aircraft produces complex identification codes. This resulted in the need for complicated control devices on the aircraft.

In accordance with the present invention the control device on the aircraft for generating the identification code is eliminated and instead is produced on the ground and transmitted via radio waves to the aircraft. The transponder on each aircraft modifies the received coded interrogation signals in accordance with the setting of the switch circuit 66 and the modified signals are modulated on to a carrier wave and retransmitted back to the ground station. The switch circuits are set to modify the received signals in a manner which establishes the identity of the aircraft and/or conforms to a daily code established for identification purposes. When used, the characteristic identifying audio tones produced by the transponder provide further information as to aircraft identity. As in FIG. 4C, the characteristic audio tone may also be transmitted from the central station. These features of the present invention eliminate the need for providing a control device on the aircraft for producing the identification code since identification is provided by the switch circuits and/or the audio tones. Also, by producing the identification codes at the central station the I.F.F. system is made less susceptible to jamming and more highly sophisticated codes can be used to prevent false signals from being transmitted by enemy aircraft. If desired, the selection system previously described may also be used so that predetermined groups or individual aircraft may be interrogated as desired. It should be obvious that this arrangement will also work in a beacon-type system where the signals transmitted by the beacon gives its identity and the signals retransmitted by the aircraft give the identity of the aircraft and other information such as altitude, bearing, speed, etc.

Another use for the transponder system of the present invention, made available by the retransmission of the interrogation signals rather than the local production thereof, is in obtaining data under extremely difficult communication conditions such as would exist with an orbiting satellite. The procedure normally used to accomplish this is to have the satellite generate pulse codes corresponding to the condition of some transducer such as a thermometer, geiger counter, etc. This again necessitates the use of complex codes and code control devices, the latter being desirably avoided in a satellite whose weight is to be kept as low as possible and whose equipment is to be made as simple and trouble-free as possible because of its inaccessibility.

Figure 8:
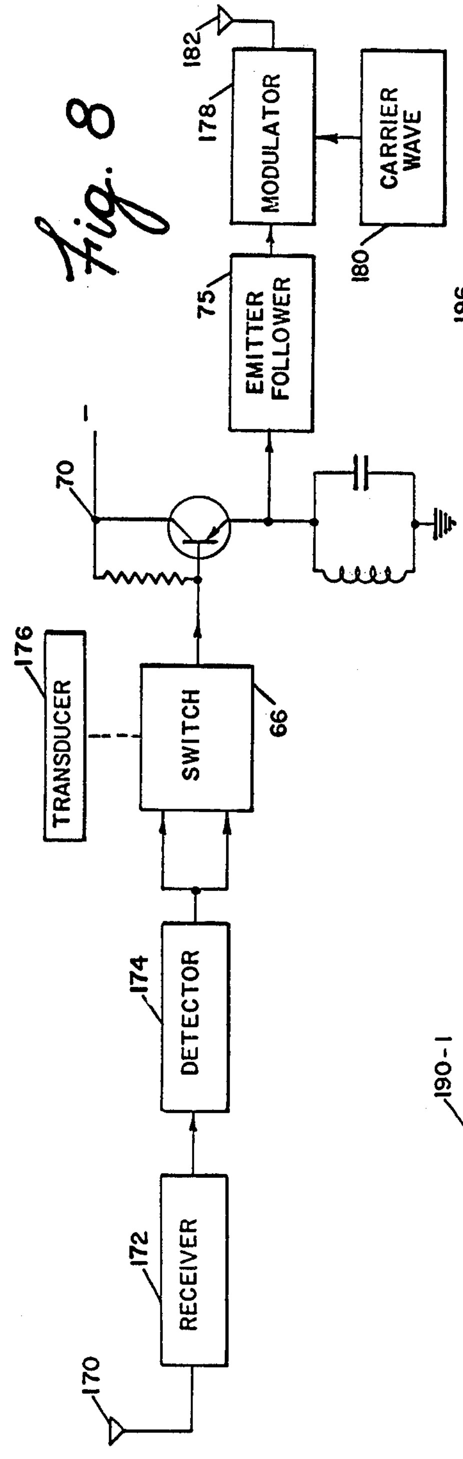
FIGS. 8 and 9 are schematic diagrams of other embodiments of transponders made in accordance with the present invention.

FIG. 8 shows a transponder suitable for use on a satellite or similar type of device to retransmit data corresponding to the condition of the equipment beng monitored. Here the central station transmits binary data illustratively in the form of a series of 1 and 0 data bits on two separate tone channels modulated onto a carrier. The two channels may be different tones, phase modulation, frequency modulation, pulse-time modulation, etc., so that the two series of bits can be readily distinguished. They would correspond to the A and B tone bits of FIGS. 4–6. The data codes are received by an antenna 170 which is connected to the input of a receiver 172. The receiver is of conventional construction for receiving AM, FM, pulse, phase, or any other type of modulated signals which may be used. The output signal of the receiver is applied to a detector 174 which separates the two series of bits in accordance with the type of modulation used. Many suitable types of detectors are conventionally available for performing this operation.

The two series of bits are applied to the input of the switch circuit 66 which performs the same function as previously described with respect to FIGS. 5 and 6. If desired, more than two tones or series of bits may be transmitted from the central station. In this case, an additional number of modifications of the received signals is made possible by adding additional logic modules to the switch circuit 66.

In the circuit of FIG. 8, it is assumed that only a single remote station is to be interrogated so no selection signals are transmitted. Also, the transponder does not have a recognition register. If two or more remote stations are to be interrogated, then these stations are provided with the transponder selection apparatus previously described.

The switch circuit 66 is under the control of a transducer 176 which makes some type of measurement such as temperature, equipment conditiion, radiation count, meteorite collision count, etc. The output of the transducer 176 controls the setting of the switch circuit 66 to determine the logical modification of the code which is to be produced.

The output string of 1 and 0 bits of the switch circuit 66 is applied to the transistor 70 which produces ringing pulses of tone frequencies corresponding to the identity of the station. The characteristic audio tone may also be produced in the manner set forth with respect to the transponders of FIGS. 4B and 4C. Where only a single station is to be interrogated from the central station the circuits for producing the audio tones may be omitted since there is no need for the tone identification capability. The output pulses from transistor 70 are applied to the input of the emitter follower 75 and then to a modulator 178 where they are modulated onto a carrier wave produced by a carrier wave generator 180. The modulated carrier signal is transmitted by antenna 182 back to the central station for data processing.

While the transponder of FIG. 8 has been described as used on a satellite, it should be understood that it may be used at any remote station including those of the subscription television type where it is desired to interrogate the remote station by the use of transmitted radio signals rather than signals on a transmission line. As indicated previously, the selection tones and selection circuits may be used where the signals are received as radio waves rather than over a transmission line.

Figure 9:
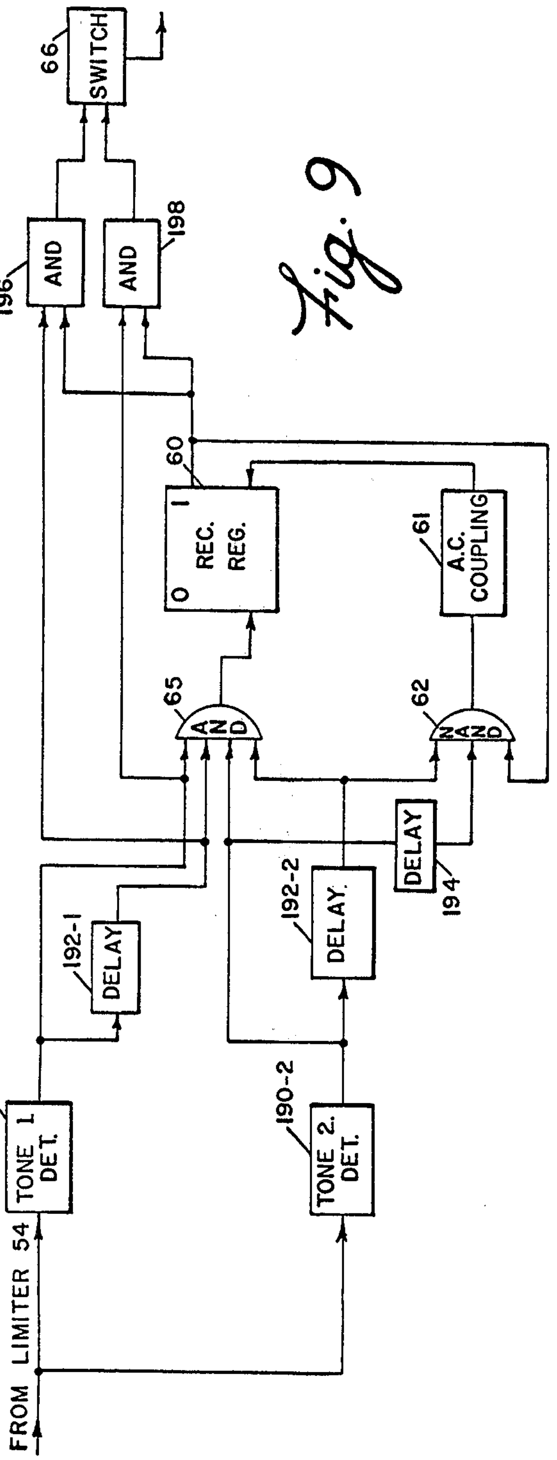

FIG. 9 is a diagram of a transponder for operating in a system in which the bandwidth needed for transmitting the selection and interrogation signals is reduced. Here two tones, Tone 1 and Tone 2, accomplish the same selection and interrogation function as the four tones used with the transponder of FIG. 4. During the first portion of the interrogation cycle the two tones are continuously transmitted from the central station and are applied by suitable receiving circuits to the inputs of frequency selective tone detectors 190-1 and 190-2, which are formed to select particular frequencies to actuate the register. The output of each tone detector 190 is applied directly to a respective input of the four-input AND circuit 65. The outputs of the respective tone detectors are also applied to a respective delay circuit 192-1 and 192-2, such as a delay line. Each of the delay lines produces a delay approximately equal to the duration of one bit of the interrogation signals transmitted during the third portion of the interrogation cycle. The outputs of the delay lines are also supplied to the input of AND circuit 65.

When both Tones 1 and 2 are transmitted simultaneously by the central station, the AND gate 65 is conditioned by the two direct and the two delayed tone signals after a one bit delay to set recognition register 60. This corresponds to the first set of A, B, C and D tones of the transponder of FIGS. 4A-C. During the second portion of the interrogation cycle the central station transmits Tone 2 as the second "set" of selection tones. when the transponder being described is to be interrogated, a three-input NAND circuit 62 is wired to receive the delayed and undelayed Tone 2 signals at two of its inputs and the set signal from the recognition register at its third input. The undelayed Tone 2 signal from the output of tone detector 190-2 is applied through a one-bit delay circuit 194 to make all of the signals appear simultaneously at the input of the NAND circuit. As long as the Tone 2 signal is received as the second set selection signal then the recognition register is left in the set condition. If any one or all signals are not received at its three inputs, the NAND circuit applies a pulse through A.C. coupling circuit 64 to reset the register.

During the third portion of the interrogation cycle, the central station transmits a continuous Tone 2 signal to keep the recognition register set. The interrogation signals are transmitted as bits on the Tone 1 channel. The undelayed interrogation bits at the output of tone detector 190-1 are applied to one input of an AND gate 198 while the delayed interrogation bits at the output of circuit 192-1 are applied to one input of a second AND gate 196. Thus, two 1 or 0 bits are produced, one direct and one delayed, where only one bit was transmitted. Each of the AND gates 196 and 198 also receives a continuous conditioning signal from the "set" output of the recognition register so that upon receipt of the interrogation bit signals the respective AND gate is conditioned to produce an output signal. These two output signals are applied to the switch circuit 66, where they are modified in the manner previously described. Transmission of the modified bits back to the central station is accomplished directly, or by an AM, FM, PM or other type of modulated radio carrier, etc. Also, any of the three identifying tone production systems described in FIGS. 4A-4C may be utilized.

It can thus be seen in FIG. 9 that the two input interrogation signals applied to the switch circuit 66 are produced by a single tone signal rather than by the two separate tones needed to produce two signals in the transponders of FIG. 4A–4C. This results in a saving of bandwidth since the same selection and interrogation is obtained by using two signals instead of the four previously needed. Of course, this arrangement can be extended to have any number of tone signals used for selection and/or interrogation purposes.

Therefore, it can be seen that an interrogated transponder system has been described which makes use of relatively simple transponders since no complex coding equipment is needed at each transponder. Also, an arrangement is provided wherein selective ones or a group of remote stations can be selected for interrogation by signals transmitted from central stations. It should be understood that the preferred embodiment of the invention described, wherein $m=9$, $n=4$ and $k=1$ and the group size of eight, is for illustrative purposes only. Any other suitable number of signals may be used for each set of selection signals and the group size selected as desired to increase or decrease the data handling capacity of the system in a corresponding manner.

While preferred embodiments of the invention have been described above, it will be understood that these are illustrative only, and the invention is limited solely by the appended claims.

What is claimed is:

1. A selectively actuated transponder for retransmitting interrogation signals received from a central station comprising means responsive to a group of predetermined selection signals for producing a transponder actuating signal, means for modifying the received interrogation signals in accordance with certain informational characteristics, means responsive to said actuating signal for transmitting the modified interrogation signals back to the central station, and means for imparting to the retransmitted signals a frequency characteristic which is indicative of the transponder producing them.

2. A selectively actuated transponder for retransmitting interrogation signals received from a central station comprising means responsive to a group of predetermined selection signals for producing a transponder actuating signal, means for modifying the received interrogation signals in accordance with certain informational characteristics, means responsive to said actuating signal for retransmitting the modified interrogation signals back to the central station, and means for imparting a characteristic to the retransmitted signals which is indicative of the transponder producing them.

3. A transponder system operative to retransmit in modified form interrogation pulse signals received from a station comprising means for receiving the interrogation pulse signals from the station, means for performing logical operations on the received interrogation signals, means for controlling the operation of the logical operating means in accordance with an existing condition, and circuit means operative in response to the logically modified interrogation pulse signals to produce signals having a predetermined frequency characteristic for retransmission to the station.

4. A transponder system for actuation by a predetermined set of selection signals transmitted from a station to retransmit in modified form interrogation pulse signals also received from the station comprising means responsive to the predetermined set of selection signals for actuating the transponder to be responsive to the received interrogation pulse signals, means for receiving the interrogation pulse signals from the station, means for performing logical operations on the received interrogation signals to produce logically modified interrogation signals, means for controlling the operation of the logical operation performing means in accordance with an existing condition, and means operative in response to the logically modified interrogation pulse signals to produce signals having a predetermined frequency characteristic for retransmission to the station.

5. A method of interrogating a plurality of remote stations from a central station for acquiring operating data of the station including the steps of transmitting individual interrogation signals to each of a plurality of remote stations, receiving the interrogation signals at the station corresponding to the individual interrogation signals, operating on the received interrogation signals in accordance with the operating status of the station, and retransmitting the resulting interrogation signal with a remote station identification characteristic to the central station.

6. A method of interrogating a plurality of remote stations from a central station as defined in claim 5 wherein the step of operating on the received interrogation signal comprises transmitting the received interrogation signal unmodified if the station is inoperative or transmitting a modified interrogation on signal in accordance with the operating status of the station if the station is operative.

7. A method of interrogating a receiver in a network of receivers from a central station for determining the operating status thereof, including the steps of transmitting a receiver selection signal for selecting at least a single receiver in the network to be interrogated from a central station, transmitting a receiver interrogation signal to cause the selected receiver or receivers to be responsive thereto, modifying the received interrogation signal at the receiver in accordance with the operating status of the the receiver, and retransmitting the resulting interrogation signal with a receiver identification characteristic to the central station.

8. A method of interrogating a receiver in a network of receivers from a central station as defined in claim 7 wherein the step of modifying the interrogation signal includes modifying the signal to impart a characteristic thereto for identifying the operability or non-operability of the receiver and when operable the particular type of operation.

9. A transponder comprising means to receive interrogation signals transmitted by an external source, means to recode those signals in accordance with informational characteristics, and means to re-transmit the recoded interrogation signals, said transponder including means conditioned by a first set of signals transmitted from said source and fully actuated by a second set of signals transmitted from said source, said first and second sets of signals and said interrogation signals all being discrete and sequential sets of signals.

10. A transponder according to claim 9 in which the second set of signals consists of signals selected from the first set.

11. A transponder according to claim 9 and in which said interrogation signals are signals subsequent to said first and second signal sets and are selected from said first set of signals which did not appear in said second set of signals.

12. A transponder according to claim 9 and in which the interrogation signals are received as 1 and 0 bits of data and the recoding of these signals is achieved by logic circuits in the transponder which produce true and complementary bit signals corresponding to the received bit signals in accordance with the condition of apparatus being monitored by the interrogation signals.

13. Transmission and remote decoding equipment comprising:

means for providing M different frequency signals, means for selecting from said M signals a set of N different frequency signals, N being an integer less than M, means for selecting a K signal from said N signals, K being an integer less than N, means for sequentially transmitting said N and K signals, means including a set of N different frequency detecting means remotely connected to said transmitting means for providing an output signal upon detecting the receipt therefrom of said N different frequency signals within a given time, means for supplying an oscillating signal, and means responsive to said output signal and to said K signal for controlling said oscillating signal supplying means.

* * * * *